No. 734,123. Patented July 21, 1903.

UNITED STATES PATENT OFFICE.

ARTHUR EICHENGRÜN AND THEODOR BECKER, OF ELBERFELD, GERMANY, ASSIGNORS TO FARBENFABRIKEN OF ELBERFELD CO., OF NEW YORK, N. Y., A CORPORATION OF NEW YORK.

ACETYL CELLULOSE.

SPECIFICATION forming part of Letters Patent No. 734,123, dated July 21, 1903.

Application filed January 8, 1902. Serial No. 88,899. (Specimens.)

*To all whom it may concern:*

Be it known that we, ARTHUR EICHENGRÜN and THEODOR BECKER, doctors of philosophy, chemists, residing at Elberfeld, Germany, (assignors to the FARBENFABRIKEN OF ELBERFELD CO., of New York,) have invented a new and useful Improvement in Acetylized Derivatives of Cellulose; and we hereby declare the following to be a clear and exact description of our invention.

Our invention relates to the production of a new acetylized derivative of cellulose, which is characterized by the fact that it is readily soluble in alcohol. The process for preparing this new body consists in treating hydrocellulose with a mixture of acetic anhydrid and sulfuric acid.

Our process differs from that described in Letters Patent No. 654,988 by Lederer in that we employ a larger quantity of sulfuric acid. In contradistinction to the acetyl cellulose obtained by Lederer our new acetylized derivative of cellulose is soluble in alcohol.

In carrying out the new process practically we can proceed as follows, the parts being by weight: One hundred and twenty-five parts of hydrocellulose are introduced into a mixture prepared from five hundred parts of glacial acetic acid, five hundred parts of acetic anhydrid, and twenty-five parts of sulfuric acid of 66° Baumé. The reaction mixture is allowed to stand at the ordinary temperature on stirring it from time to time. After some hours the hydrocellulose is dissolved, and the reaction mass forms a thin liquid solution which can easily be filtered. Subsequently it is poured into water, by which means the new product is precipitated in the shape of white flakes, which are filtered off and dissolved in five times its quantity of alcohol. On cooling the resulting solution grows stiff to a mass like gelatin.

The new acetylized derivative of cellulose is a white mass readily soluble in alcohol. Its concentrated alcoholic solution represents in the cold a solid mass like gelatin, which liquefies on heating or on adding alcohol. From the solutions in alcohol, acetone, glacial acetic acid, or the like the new body is precipitated in the shape of white flakes by the addition of water.

Having now described our invention and in what manner the same is to be performed, what we claim as new, and desire to secure by Letters Patent, is—

The herein-described acetyl cellulose characterized by being readily soluble in alcohol, its concentrated alcoholic solution representing in the cold a solid mass like gelatin which turns liquid again on heating, being precipitated in the shape of white flakes from its solutions in alcohol, acetone or glacial acetic acid by the addition of water, substantially as hereinbefore described.

In testimony whereof we have signed our names in the presence of two subscribing witnesses.

ARTHUR EICHENGRÜN.
THEODOR BECKER.

Witnesses:
 OTTO KÖNIG,
 J. A. RITTERSHAUS.